US008565104B2

(12) United States Patent
Miyata et al.

(10) Patent No.: US 8,565,104 B2
(45) Date of Patent: Oct. 22, 2013

(54) FIELD CONTROL SYSTEM AND FIELD CONTROL METHOD

(75) Inventors: Hiroshi Miyata, Musashino (JP);
Yukiyo Akisada, Musashino (JP);
Masahito Endo, Musashino (JP); Hiroki Endo, Musashino (JP); Kensuke Hosoya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1071 days.

(21) Appl. No.: 12/231,015

(22) Filed: Aug. 27, 2008

(65) Prior Publication Data

US 2009/0105850 A1  Apr. 23, 2009

(30) Foreign Application Priority Data

Aug. 31, 2007  (JP) ................................. 2007-226124

(51) Int. Cl.
*H04L 12/26* (2006.01)

(52) U.S. Cl.
USPC ............................ 370/252; 370/236; 370/516

(58) Field of Classification Search
USPC ......... 370/229, 236, 238, 248, 252, 508, 516, 370/517, 519
See application file for complete search history.

(56) References Cited

U.S. PATENT DOCUMENTS

| | | | | |
|---|---|---|---|---|
| 6,366,563 B1 * | 4/2002 | Weldon et al. | ................ | 370/252 |
| 6,862,618 B1 * | 3/2005 | Gray et al. | .................... | 709/224 |
| 7,307,989 B2 * | 12/2007 | Ofek et al. | .................... | 370/389 |
| 7,646,717 B1 * | 1/2010 | Anker et al. | .................. | 370/235 |
| 7,697,452 B2 * | 4/2010 | Tachibana et al. | ............ | 370/252 |
| 7,729,247 B2 * | 6/2010 | Kim et al. | ...................... | 370/230 |
| 7,817,568 B2 * | 10/2010 | Paik et al. | ...................... | 370/252 |
| 2003/0115321 A1 * | 6/2003 | Edmison et al. | ............. | 709/224 |
| 2003/0198235 A1 * | 10/2003 | Weldon et al. | ................ | 370/401 |
| 2004/0001694 A1 * | 1/2004 | Evans et al. | ..................... | 386/68 |
| 2004/0008661 A1 * | 1/2004 | Myles et al. | .................. | 370/350 |
| 2005/0068928 A1 * | 3/2005 | Smith et al. | ................... | 370/338 |
| 2005/0163064 A1 * | 7/2005 | Choi et al. | .................... | 370/278 |
| 2006/0250965 A1 * | 11/2006 | Irwin | ............................ | 370/238 |
| 2008/0225805 A1 * | 9/2008 | Pearson et al. | ................ | 370/338 |
| 2009/0059958 A1 * | 3/2009 | Nakata | .......................... | 370/474 |

FOREIGN PATENT DOCUMENTS

| JP | 10-177410 A | 6/1998 |
|---|---|---|
| JP | 2000-216847 A | 8/2000 |
| JP | 2001-53780 | 2/2001 |

* cited by examiner

*Primary Examiner* — Kwang B Yao
*Assistant Examiner* — Nguyen Ngo
(74) *Attorney, Agent, or Firm* — Sughrue Mion, PLLC

(57) ABSTRACT

In a field control system in which a plurality of field equipments that are operated in a previously set schedule and constitute a control loop perform a packet communication via a network, there is provided a configurator for collecting measured result packets to which a time stamp of each field equipment is affixed respectively, grasping at least any one of communication times between respective field equipments based on the time stamp, and adjusting operation schedules of respective field equipments in response to the communication times.

13 Claims, 18 Drawing Sheets

FIELD CONTROL SYSTEM AND FIELD CONTROL METHOD

TECHNICAL FIELD

The present disclosure relates to a field control system and a field control method and, more particularly, schedule control of a field equipment.

RELATED ART

In recent years, as the process control system in the industrial automation, for example, a field control system built up by connecting mutually the field equipments each equipped with a sensor, an actuator, a controller such as a flowmeter, a thermometer, and the like constituting a control loop such as feedback control, or the like via the network has been proposed. Such field control system is constructed such that an operation schedule of each field equipment is set and a control loop constructed by the field equipments is operated as scheduled.

As the prior technical literature related to the field control system in the related art, following one exists.
[Patent Literature 1] Japanese Patent Application Publication No. 2001-053780

FIG. 12 is a configurative block diagram showing an example of the field control system in the related art. In FIG. 12, a sensor 1 has a sensor function of measuring physical quantities such as temperature, flow rate, and the like, and a communication function of transmitting measured values of these physical quantities by using IP (Internet Protocol). A controller 2 operates/controls actuators 3 such as a valve, a regulating valve, and the like such that the plant is run optimally and the measured value of the sensor 1 converge at predetermined target values. An actuator 3 has a controlling function of controlling physical quantities such as temperature, flow rate, and the like, and a communication function of transmitting data. A configurator 4 has a schedule setting function of setting operation schedules of the sensor 1, the controller 2, and the actuator 3, and a communication function of transmitting schedule information.

The sensor 1, the controller 2, and the actuator 3 are installed in the plant to constitute a feedback control loop. Also, the sensor 1, the controller 2, the actuator 3, and the configurator 4 are connected mutually via a network NW100.

Here, a flow of data communication DF100 via which the sensor 1 feeds the packet containing the measured value to the controller 2, a flow of data communication DF101 via which the controller 2 feeds the packet containing the control value to the actuator 3, and a flow of data communication DF102 via which the actuator 3 feeds the packet containing the feedback information to the controller 2 are shown in FIG. 12.

FIG. 13 is a configurative block diagram of the configurator 4 in FIG. 12. A communicating portion 41 performs communication with the sensor 1, the controller 2, and the actuator 3 mainly, and is connected to an operation controlling portion 42 such as CPU (Central Processing Unit) that controls operations of respective parts, or the like. The operation controlling portion 42 is connected to a memory portion 43. A program required for the operation of the configurator 4, schedule information of the sensor 1, the controller 2, and the actuator 3, and the like are stored in the memory portion 43.

FIG. 14 is a functional block diagram of the operation controlling portion 42 constituting the configurator 4 in FIG. 13. A packet transmitting/receiving portion 421 executes transmission/reception of the packet. A packet analyzing portion 422 analyzes the packet obtained by the packet transmitting/receiving portion 421. A schedule information storing portion 423 stores schedule information that are used to set processing times of the sensor 1, the controller 2, and the actuator 3.

A schedule setting portion 424 forms schedule setting information to set the operation schedules of the sensor 1, the controller 2, and the actuator 3 mainly based on the schedule information stored in the packet transmitting/receiving portion 421. A packet generating portion 425 generates the packet to set the schedules of respective field equipments via the network based on the schedule setting information.

The configurator 4 constructed in this manner sets in advance respective schedules of the processing times of the sensor 1, the controller 2, and the actuator 3 constituting the feedback control loop. For example, in the configurator 4 in FIG. 14, the schedule setting portion 424 forms the schedule setting information, which are used to set the operation schedules of respective field equipments, from the schedule information of the schedule information storing portion 423. The packet generating portion 425 generates the packet containing the schedule setting information, and transmits this packet to respective field equipments. Each field equipment sets the schedule based on the schedule setting information respectively.

FIG. 15 is a configurative block diagram of the sensor 1 in FIG. 14. A communicating portion 11 performs communication with the controller 2, the actuator 3, and the configurator 4 mainly, and is connected to an operation controlling portion 12 such as CPU (Central Processing Unit) that controls operations of respective parts, or the like. The operation controlling portion 12 is connected to a memory portion 13. A program necessary for the operation of the sensor 1, the schedule information, and the like are stored in the memory portion 13. In this case, configurations of the controller 2 and the actuator 3 are substantially similar to that of the sensor 1, and their explanation will be omitted herein.

FIG. 16 is a functional block diagram of the operation controlling portion 12 constituting the sensor 1 in FIG. 15. A packet transmitting/receiving portion 121 executes the transmission/reception of the packet. A packet analyzing portion 122 analyzes the packet obtained by the packet transmitting/receiving portion 121 to extract the schedule information. A schedule information storing portion 123 stores the schedule information fed from the configurator 4. An inherent function executing portion 124 executes control processes (for example, measurement of the physical quantity, notice of the measured value, calculation of the control data, etc.) based on the schedule information stored in the schedule information storing portion 123. A packet generating portion 125 generates the packet, which is sent to the controller 2 via the network, based on the measured value obtained by the inherent function executing portion 124. A schedule setting portion 126 stores the schedule information being analyzed by the packet analyzing portion 122 in the schedule information storing portion 123.

FIG. 17 is a flowchart explaining operations of the field control system, and FIG. 18 is an explanatory view of an operation schedule and a communication time of each field equipment. In FIG. 17, operations of the field control system will be explained based on flows of the data communications DF100 to DF102 in FIG. 12.

In this case, the operation schedule of each field equipment is repeated every predetermined period, and this period is called a "macro cycle". In other words, each field equipment is scheduled to operate within the macro cycle. For example, as shown in FIG. 18, a processing time of the sensor 1 is set as "T0-T1", a processing time of the controller 2 is set as "T2-

T3", and a processing time of the actuator 3 is set as "T4-T5". Also, the operation start times T0, T2, T4 of respective field devices are called the offset.

First, in step S101, the inherent function executing portion 124 of the sensor 1 measures the physical quantities such as flow rate, temperature, etc. based on the previously decided schedule that is stored in the schedule information storing portion 123. The packet generating portion 125 generates the packet containing the measured value. The packet transmitting/receiving portion 121 transmits the packet to the controller 2.

As shown in FIG. 18, the sensor 1 measures the physical quantities such as flow rate, temperature, etc. within the processing time "T0-T1" decided previously, and transmits the packet containing the measured value to the controller 2 as indicated with the flow of the data communication DF100 in FIG. 12. In this case, the measured value transmitted from the sensor 1 needs a communication time "Ta (T1-T2)" to reach the controller 2.

In step S102, the controller 2 calculate "control data" as set information to control the actuator 3 based on the previously decided schedule such that the received measured value converges at the previously set target value and the plant is run optimally. As shown in FIG. 18, the controller 2 calculates the control data within a previously decided processing time "T2-T3".

In step S103, the controller 2 transmits the packet containing the calculated control data to the actuator 3, based on the previously decided schedule. As shown in FIG. 18, the controller 2 transmits the packet containing the control data to the actuator 3 within the previously decided processing time "T2-T3" as indicated with the flow of the data communication DF101 in FIG. 12.

In step S104, the actuator 3 operates based on the control data in compliance with the previously decided schedule. For example, the actuator 3 executes the operation such that the valve changes its opening based on the control data to adjust a flow rate.

In step S105, the actuator 3 transmits the packet containing feedback data such as a current operation state of the actuator 3 (e.g., a valve opening is 80%, or the like) to the controller 2. As shown in FIG. 18, the actuator 3 transmits the packet containing the feedback data to the controller 2 within a previously decided processing time "T4-T5" as indicated with the flow of the data communication DF102 in FIG. 12.

In this manner, in the field control system, respective field equipments operates in compliance with the operation schedule being set within the macro cycle, and the actuator 3 is controlled such that the measured value converges at the previously set target value. Therefore, the field control system can run the plant optimally.

Also, the communication time between respective field equipments has the predetermined unique value when, as shown in FIG. 12, communication is established in a single segment. The communication time between the sensor 1 and the controller 2 is given as "Ta (T1-T2)", the communication time between the controller 2 and the actuator 3 is given as "Tb (T3-T4)", and the communication time between the actuator 3 and the controller 2 is given as "Tc (T5-T6)". These communication times have an equal time respectively. In this manner, when communication is established in a single segment, the configurator 4 can set easily the offset in the operation schedule based on the communication times Ta, Tb, Tc.

Meanwhile, when the field control system is built up by the complicated network having a relay device, or the like, the communication times between respective field equipments are prolonged or shortened depending on a load condition of the network, a load condition of the relay device, and the like.

FIG. 19 is a configurative block diagram showing an example of the field control system constructed via the relay device. The configurations of the sensor 1, the controller 2, the actuator 3, and the configurator 4 are similar to those in FIG. 12. A relay device 5 has a communication function of transmitting the data, and transfers the received data.

The sensor 1 and the controller 2 are connected mutually via the network NW100, and the actuator 3 and the configurator 4 are connected mutually via a network NW101. The relay device 5 is connected to the network NW100 and the network NW101 mutually.

Also, a flow of data communication DF200 via which the sensor 1 feeds the packet containing the measured value to the controller 2, a flow of data communication DF201 via which the controller 2 feeds the packet containing the control value to the actuator 3, and a flow of data communication DF202 via which the actuator 3 feeds the packet containing the feedback information to the controller 2 are shown in FIG. 19.

In FIG. 19, the controller 2 and the actuator 3 communicate with each other via the relay device 5. Therefore, the communication time between the controller 2 and the actuator 3 is changed by the influence of the load condition of the relay device 5 during the transmission, and is not always a constant time. FIG. 20 is an explanatory view of the communication times between the field equipments of the field control system in FIG. 19.

As shown in FIG. 20, the communication time "Ta (T1-T2)" required when the sensor 1 transmits the packet containing the measured value to the controller 2 (e.g., flow of data communication DF200), the communication time "Tb (T3-T4)" required when the controller 2 transmits the packet containing the control data to the actuator 3 (e.g., flow of data communication DF201), and the communication time "Tc (T5-T6)" required when the actuator 3 transmits the packet containing the feedback data to the controller 2 (e.g., flow of data communication DF202) have a different time mutually depending on the load condition of the network and the load condition of the relay device.

Therefore, sometimes respective field equipments cannot execute the process related to the control loop in compliance with the schedule decided previously. Also, when the configurator 4 sets the offset in the operation schedule of the field equipment, such configurator must derive the offset while grasping the communication times Ta, Tb, Tc that are different respectively.

In this manner, when the field control system in the related art is set up via the complicated network, the communication times between respective field equipments are prolonged or shortened depending on the load condition of the network, the load condition of the relay device, and the like. Therefore, such a problem exists that the deviation occurs in the schedule of the field equipment.

Also, when respective field equipments do not operate as scheduled, the control loop does not act normally and thus an expected result cannot be achieved. Therefore, such a problem also exists that the actuator cannot be controlled such that the measured value transferred from the sensor converges at the previously decided target value and the plant is run optimally.

SUMMARY

Exemplary embodiments of the present invention provide a field control system and a field control method capable of controlling an operation schedule of a field equipment by taking account of communication times required between respective field equipments.

A first invention provides a field control system in which a plurality of field equipments that are operated in a previously set schedule and constitute a control loop perform a packet communication via a network, which includes a configurator for collecting measured result packets to which a time stamp of each field equipment is affixed respectively, grasping at least any one of communication times between respective field equipments based on the time stamp, and adjusting operation schedules of respective field equipments in response to the communication times.

In a second invention, in the field control system according to the first invention, the field equipment transmits a time measurement packet to at least any one of other field equipments, and transmits a measured result packet, to which a transmission time of a sender field equipment of the time measurement packet and a reception time of a destination field equipment are added, to the configurator.

In a third invention, in the field control system according to the first or second invention, the field equipment, when detects a delay of a control process, transmits a delay notice packet to the configurator.

In a fourth invention, in the field control system according to the third invention, the configurator transmits a measurement request packet to the field equipment based on the delay notice packet, and the field equipment transmits the time measurement packet based on the measurement request packet.

In a fifth invention, in the field control system according to any one of the first to fourth inventions, the field equipment has a communicating portion for performing a packet communication, a storing portion for storing schedule information of the field equipment, and an operation controlling portion for transmitting a time measurement packet to at least any one of respective field equipments and transmitting measured result data to which a transmission time and a reception time of the time measurement packet are added to a configurator.

In a sixth invention, in the field control system according to the fifth invention, the operation controlling portion transmits the delay notice packet unless the control packet arrives at within a schedule.

In a seventh invention, in the field control system according to any one of the first to fifth inventions, the configurator has a communicating portion for performing the packet communication, a storing portion for storing schedule information of the field equipment and the communication time, and an operation controlling portion for transmitting a time measurement packet to the field equipment, calculating the communication time based on the transmission time and the reception time of the time measurement packet added to the measured result packet of the field equipment, and adjusting a schedule of the field equipment based on the communication time.

According to the present invention, the configurator controls the operation schedule of the field equipment by taking account of a communication time required between respective field equipments.

Other features and advantages may be apparent from the following detailed description, the accompanying drawings and the claims.

DETAILED DESCRIPTION

Figure 1:
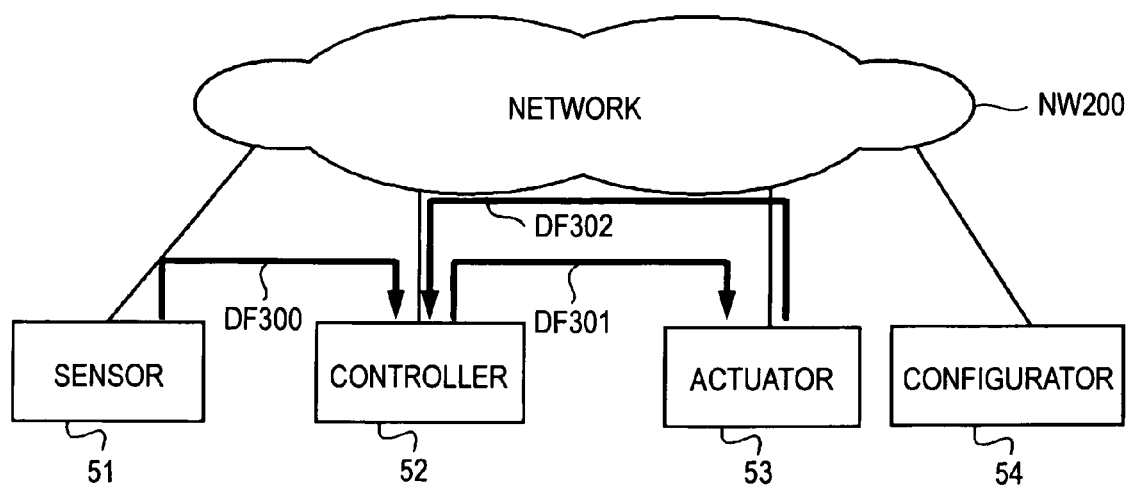
FIG. 1 is a configurative block diagram showing an embodiment of a field control system according to the present invention.

FIG. 1 is a configurative block diagram showing an embodiment of a field control system according to the present invention. A sensor 51 has a sensor function, a communication function, and a time stamp function of affixing a "time stamp" such as transmit time, receive time, etc. of the data associated with the feedback control. A controller 52 has a communication function, and a time stamp function, and operates/controls actuators 53 such as a valve, a regulating valve, and the like such that the measured value of the sensor 51 converge at predetermined target values. An actuator 53 has a control function for the operation/control, a communication function, and a time stamp function. A configurator 54 has a control function, a schedule setting function, and a communication period grasping function of measuring/grasping communication periods of respective field equipments.

The sensor 51, the controller 52, and the actuator 53 constitute the feedback loop, and connected mutually via a complicated network NW200 in which relay devices such as plural routers, switches, etc. are provided. Here, the configuration of the field control system according to the present invention is similar to that of the related-art system except that a time stamp function of each field equipment and a communication period measuring function of the configurator 54, and therefore explanation of respective parts will be omitted appropriately.

In this feedback loop, when the sensor 51 transmits the packet containing the measured value to the controller 52 (e.g., flow of data communication DF300), when the controller 52 transmits the packet containing the control value to the actuator 53 (e.g., flow of data communication DF301), and the actuator 53 transmits the packet containing the feedback information to the controller 52 (e.g., flow of data communication DF302), the controller 52 controls the actuator 53 such that the measured value of the sensor 51 converges at the previously decided target value.

Figure 2:
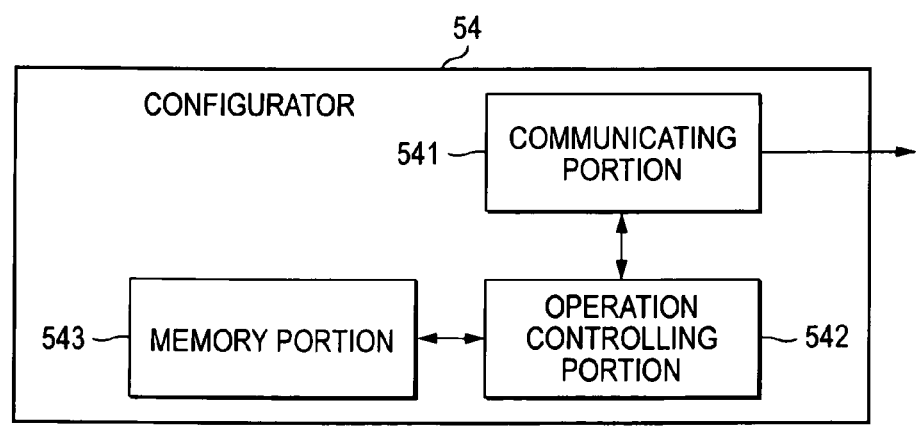
FIG. 2 is a configurative block diagram of a configurator 54 in FIG. 1.

FIG. 2 is a configurative block diagram of the configurator 54 in FIG. 1. A communicating portion 541 performs communication with the sensor 51, the controller 52, and the actuator 53 mainly, and is connected to an operation controlling portion 542 such as CPU that controls operations of respective parts, or the like. The operation controlling portion 542 is connected to a memory portion 543. A program for the operation of the configurator 54 and schedule information of the sensor 51, the controller 52, the actuator 53, and the like are stored in the memory portion 543.

Figure 3:
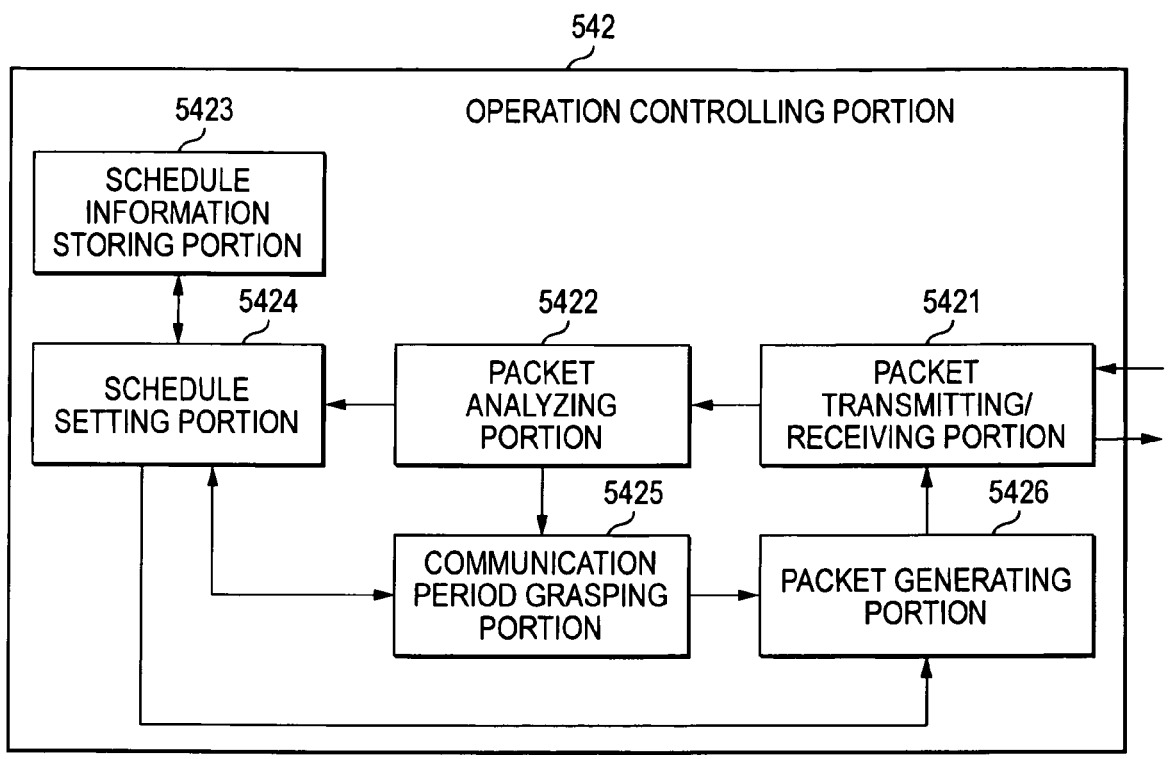
FIG. 3 is a functional bock diagram of an operation controlling portion 542 of the configurator 54 in FIG. 2.

FIG. 3 is a functional bock diagram of the operation controlling portion 542 constituting the configurator 54 in FIG. 2. A packet transmitting/receiving portion 5421 executes the transmission/reception of the packet. A packet analyzing portion 5422 analyzes the packet obtained by the packet transmitting/receiving portion 5421 to extract packet information such as time stamp, destination address, sender address, schedule information, and the like. A schedule information storing portion 5423 stores mainly the schedule information of the sensor 51, the controller 52, and the actuator 53 and the communication time obtained by a communication period grasping portion 5425.

A schedule setting portion 5424 adjusts the operation schedules of respective field equipments based on the packet information analyzed by the packet analyzing portion 5422, the schedule information of the schedule information storing portion 5423, and the communication time obtained by the communication period grasping portion 5425, and forms mainly "schedule setting information" used to set the operation schedules of the sensor 51, the controller 52, and the actuator 53. The communication period grasping portion 5425 generates "measurement request data" that call upon respective field equipments to get the time stamp, and calculates the communication periods between respective field equipments. A packet generating portion 5426 generates mainly the packets such as the packet containing the measurement request data (referred to as a "measurement request packet" hereinafter) the packet containing the schedule setting information (referred to as a "schedule set packet" hereinafter), and the like.

Figure 4:
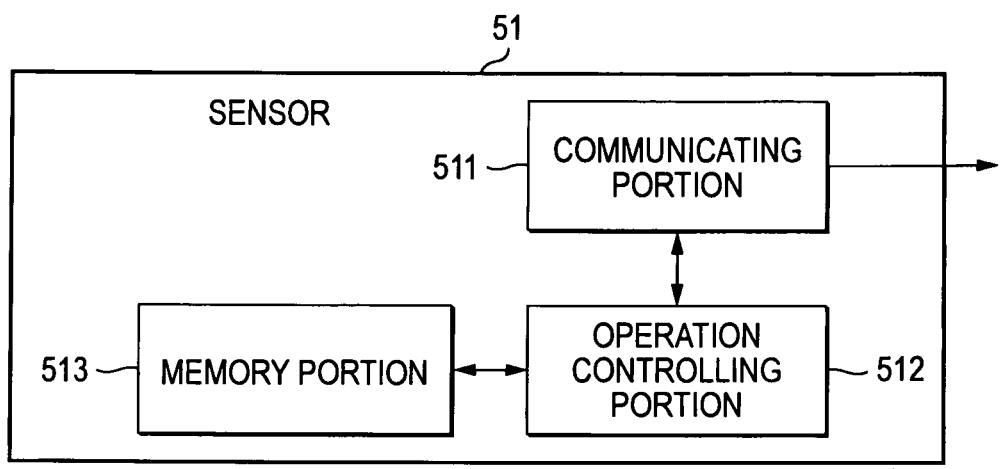
FIG. 4 is a configurative block diagram of a sensor 51 in FIG. 1.

FIG. 4 is a configurative block diagram of the sensor 51 in FIG. 1. A communicating portion 511 performs communication with the sensor 51, the controller 52, and the actuator 53 mainly, and is connected to an operation controlling portion 512 such as CPU that controls operations of respective parts, or the like. The operation controlling portion 512 is connected to a memory portion 513. A program for the operation of the sensor 51 and the schedule information are stored in the memory portion 513. In this case, the configurations of the controller 52 and the actuator 53 are substantially similar to the sensor 51, and therefore their explanation will be omitted herein.

Figure 5:
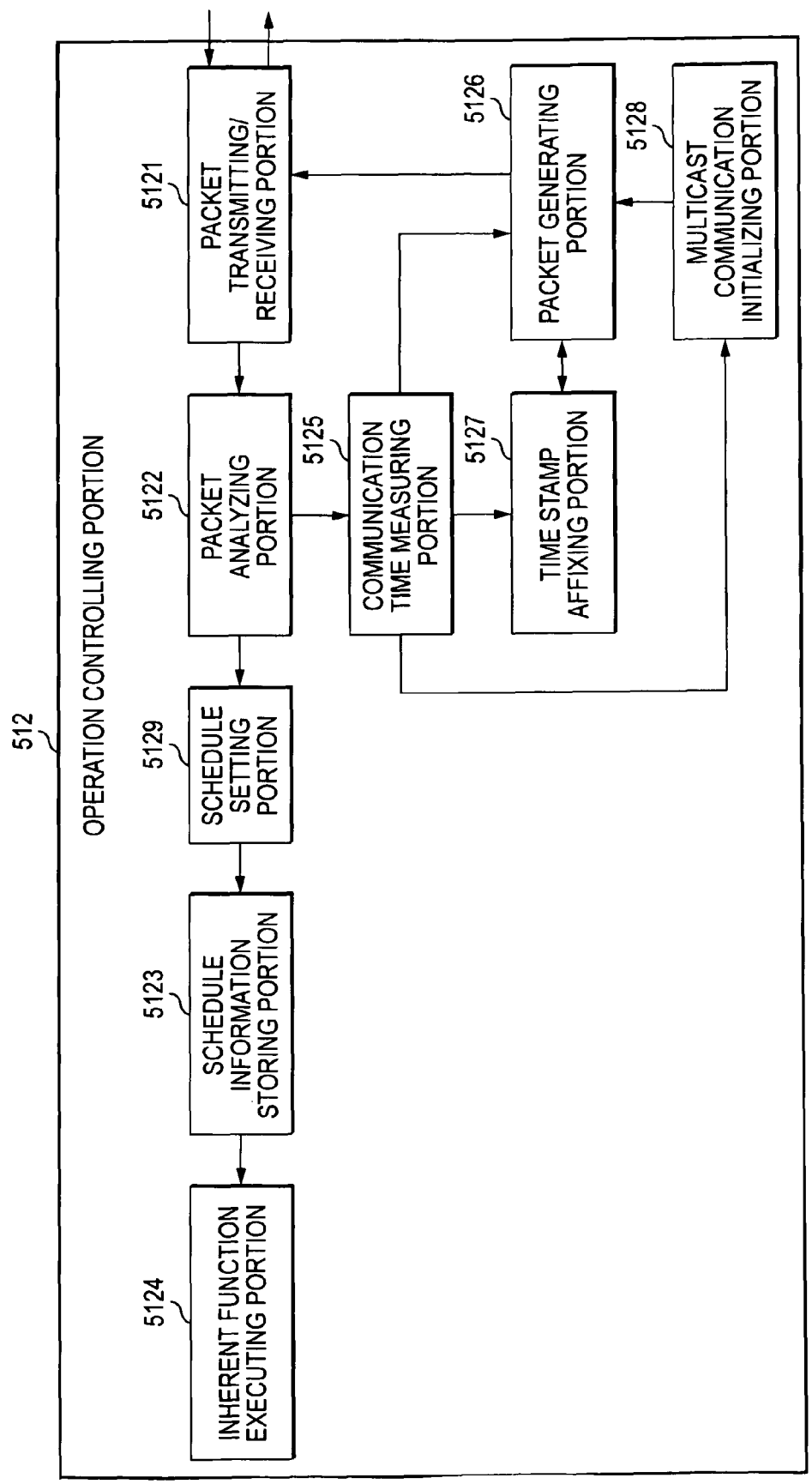
FIG. 5 is a functional bock diagram of an operation controlling portion 512 constituting the sensor 51 in FIG. 4.

FIG. 5 is a functional bock diagram of an operation controlling portion 512 constituting the sensor 51 in FIG. 4. A packet transmitting/receiving portion 5121 executes the transmission/reception of the packet. A packet analyzing portion 5122 analyzes the packet obtained by the packet transmitting/receiving portion 5121 to extract packet information such as time stamp, destination address, sender address, schedule information, and the like. A schedule information storing portion 5123 stores the schedule information for use in the control process. An inherent function executing portion 5124 executes control processes (for example, measurement of the physical quantity, notice of the measured value, calculation of the control data, etc.) based on the schedule information stored in the schedule information storing portion 5123. A communication time measuring portion 5125 generates "time measured data" that is used to get the time stamp in measuring the communication times between respective field equipments, and transmits the data to respective field equipments.

Also, a packet generating portion 5126 generates the packet containing multicast initializing data (referred to as a "multicast initialization packet" hereinafter), the packet containing time measured data (referred to as a "time measurement packet" hereinafter), the packet containing measured result data (referred to as a "measured result packet" hereinafter), and the packet used to make the transmission by the control process of the inherent function executing portion 5124 (referred to as a "control packet" hereinafter). A time stamp affixing portion 5127 affixes the "time stamp" such as a transmission time, a reception time, etc. of the time measurement packet of respective field equipments to the time measurement packet and the measured result packet. A multicast initializing portion 5128 forms "multicast initializing data" that transfers the field equipment into a state in which the field equipment can receive the multicast communication when a multicast communication is performed as the communication between respective field equipments. A schedule setting portion 5129 stores the schedule information in the schedule information storing portion 5123, based on the packet information such as the schedule information analyzed by the packet analyzing portion 5422, or the like.

Figure 6:
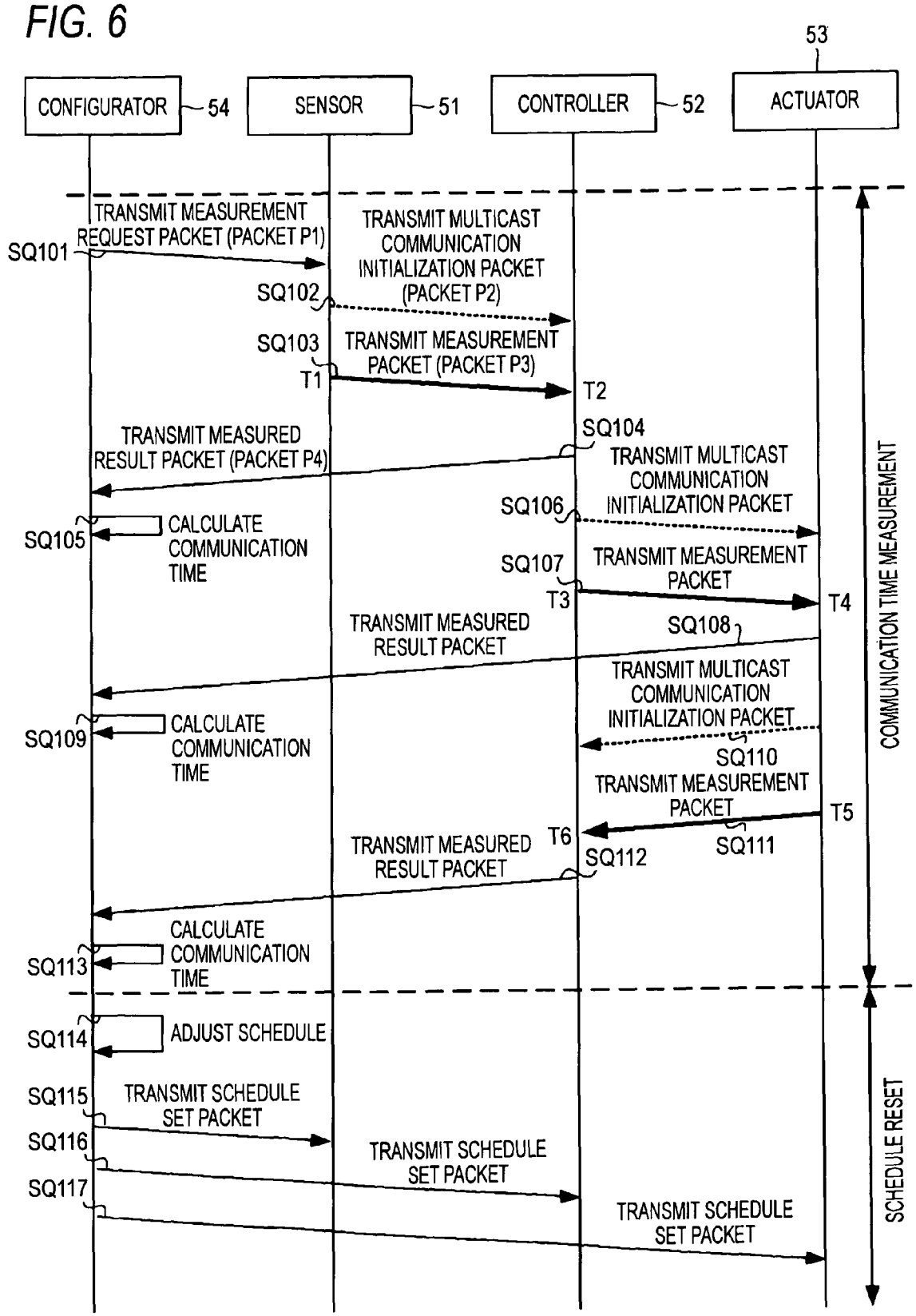
FIG. 6 is a sequence diagram explaining an example of operations of the field control system.

FIG. 6 is a sequence diagram explaining an example of operations of the field control system, and FIG. 7 to FIG. 10 are concrete examples of a packet format utilized in the field control system. Also, in order to simplify the explanation, the control process is performed in respective field equipments via the multicast communication. In this case, any communication method may be used between respective field equipments if such method can be performed based on the specification of the used field bus.

The operations of the field control system in FIG. 6 are carried out when the communication times required for the packet communication between respective field equipments are not clear on account of a change of the network configuration, etc., the system maintenance, the resetting of the system, and the like are applied, for example.

Respective field equipments transmits/receives the time measurement packet to measure the communication period. The configurator 54 grasps the communication time required for the packet communication between respective field equipments and adjusts the schedule by reflecting this communication time in the operation schedule of each field equipment. In the following, in order to simplify the explanation, it is supposed that the measurement of the communication time is made while stopping temporarily the control process of the control loop. In this case, the measurement of the communication time may be made while executing the control process of the control loop.

First, in a sequence SQ101, the communication period grasping portion 5425 of the operation controlling portion 542 of the configurator 54 generates "measuring request data" to measure the communication time required for the packet communication between respective field equipments. The packet generating portion 5426 generates a measurement request packet (e.g., the packet P1 in FIG. 7). The packet transmitting/receiving portion 5421 transmits the measurement request packet to the sensor 51 via the network NW200. In this event, the transmission/reception of the measurement request packet is made via the unicast communication.

Here, at a timing at which the configurator 54 transmits the measurement request packet, the operator may control the configurator 54 or the configurator 54 may transmit the measurement request packet after a predetermined time has elapsed.

Figure 7:
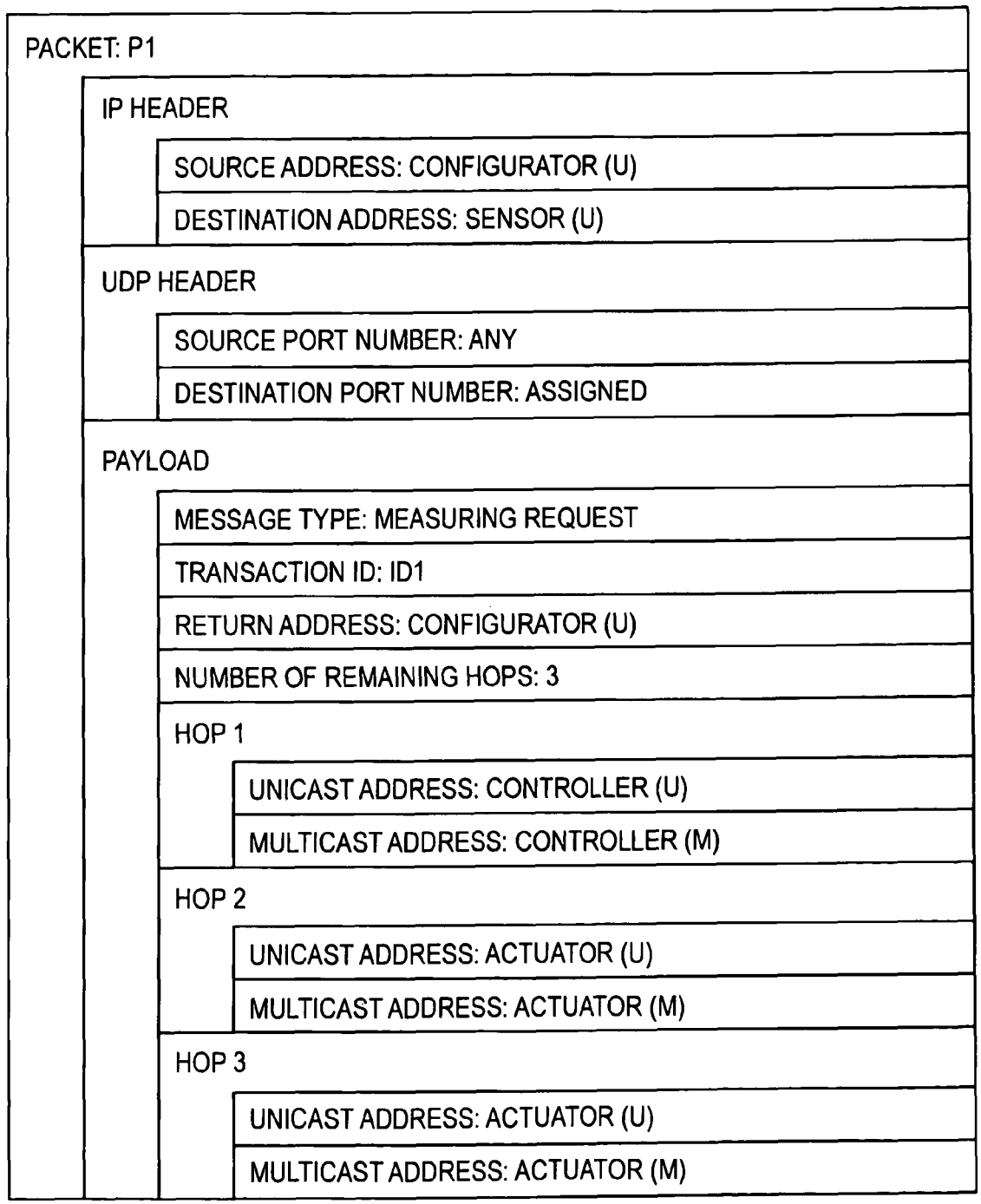
FIG. 7 is an example of a packet format utilized in the field control system.

As shown in FIG. 7, the measurement request packet has fields such as an IP header, a UDP header, a payload, and the like. The payload of this measurement request packet contains a plurality of fields such as "message type", "transaction ID", "return address", "number of remaining hops" indicating the number of field equipments required until the control has been passed around the control loop, a plurality of "hop" fields for storing the information such as unicast addresses, multicast addresses of respective hops, and the like. Also, respective "hops" store the multicast address and the unicast address. The multicast address of each field equipment used in the communication associated with the feedback control is set in the multicast address. The unicast address of each field equipment used to inform that the field equipment should be set to receive the multicast communication is set in the unicast address.

For example, the packet generating portion 5426 of the configurator 54 sets a value of the message type of the packet P1 in FIG. 7 (e.g., "measurement request"), a value of the transaction ID (e.g., "ID1"), a return address (e.g., "configurator 54"), and the number of remaining hops (e.g., "3"). Also, the packet generating portion 5426 sets "the controller 52" in the hop 1, "the actuator 53" in the hop 2, and "the controller 52" in the hop 3, and stores the unicast address and the multicast address respectively.

In this manner, the configurator 54 sets the measurement request packet to measure the communication time between respective field equipments along the flow of the control loop by setting the hop 1 to the hop 3. In this case, the configurator 54 may transmit the measurement request packet to the controller 52 or the actuator 53 if the communication time can be measured along the flow of the control loop.

In a sequence SQ102, the packet analyzing portion 5122 of the sensor 51 extracts the measurement request data by analyzing the measurement request packet fed from the configurator 54. The packet generating portion 5126 generates the multicast initialization packet (e.g., the packet P2 in FIG. 8) based on the measurement request packet, and transmits the multicast initialization packet to the controller 52 via the network NW200. In this event, the transmission/reception of the multicast initialization packet is made via the unicast communication. Also, in FIG. 6, the sequence used to transmit the multicast initialization packet is indicated with a broken line.

Figure 8:
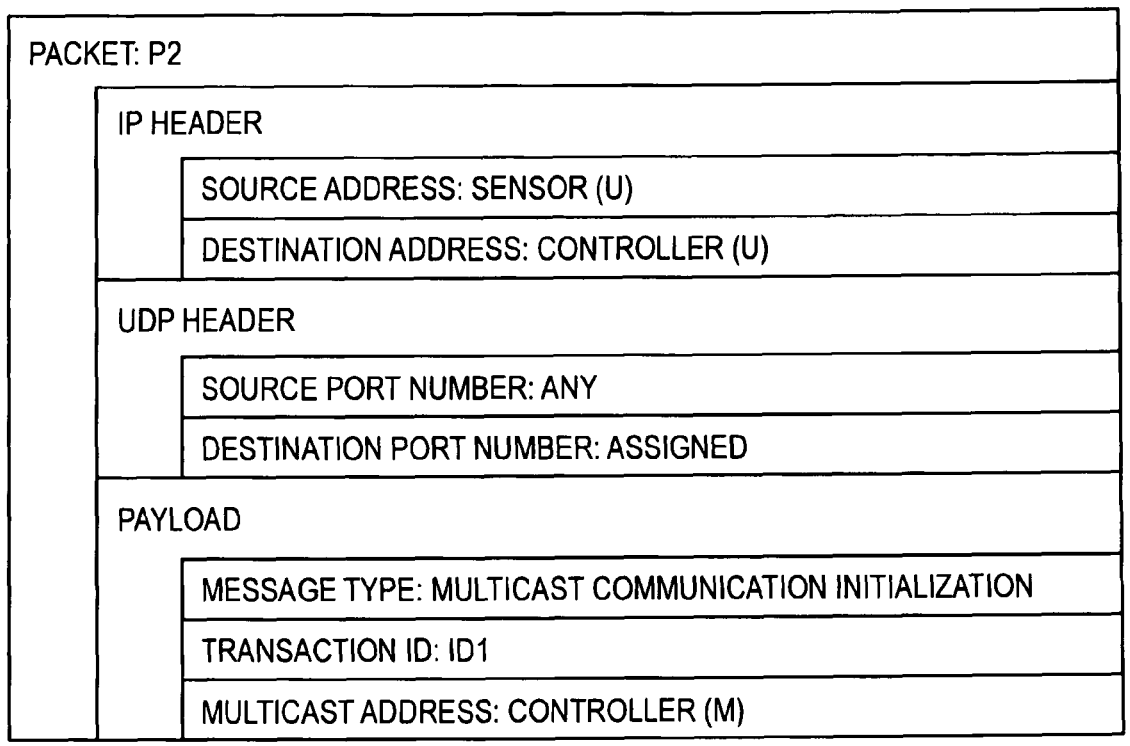
FIG. 8 is an example of the packet format utilized in the field control system.

As shown in FIG. 8, the packet P2 has the fields such as the IP header, the UDP header, the payload, and the like. The payload contains a plurality of fields such as "message type", "transaction ID", "multicast address", and others.

The packet generating portion 5126 of the sensor 51 sets a value of the source address of the IP header in the packet P2 (e.g., a value of the destination address "the sensor 51" of the packet P1) and a value of the destination address (e.g., a value of the unicast address "the controller 52" in the hop 1 of the packet P1), based on the received measurement request packet P1. That is, the packet transmitting/receiving portion 5121 sets the unicast address of the controller as the destination.

The packet generating portion 5126 sets a value of the message type in the payload in the packet P2 (e.g., "multicast communication initialization"), a value of the transaction ID (e.g., "ID1"), and the multicast address (e.g., a value of the multicast address "the controller 52" in the hop 1 of the packet P1).

Here, when the controller 52 executes the initialization of the multicast communication based on the multicast initialization packet received from the sensor 51, such controller may inform the sensor 51 of the effect of the end of initialization. Also, when the communication between respective field equipments is carried out via the unicast communication, the process may go to a sequence SQ103 without transmission of the multicast initialization packet.

In the sequence SQ103, the packet analyzing portion 5122 of the sensor 51 extracts the measurement request data by analyzing the measurement request packet fed from the configurator 54. The packet generating portion 5126 generates the time measurement packet (e.g., the packet P3 in FIG. 9) based on the measurement request data, and transmits the time measurement packet this packet to the controller 52. At this time, the time stamp affixing portion 5127 affixes a time at which the time measurement packet is transmitted (e.g., "T1") to the time measurement packet. In this event, the transmission/reception of the time measurement packet is executed via the multicast communication. Also, in FIG. 6, the sequence used to transmit the measurement packet is indicated with a thick line.

Figure 9:
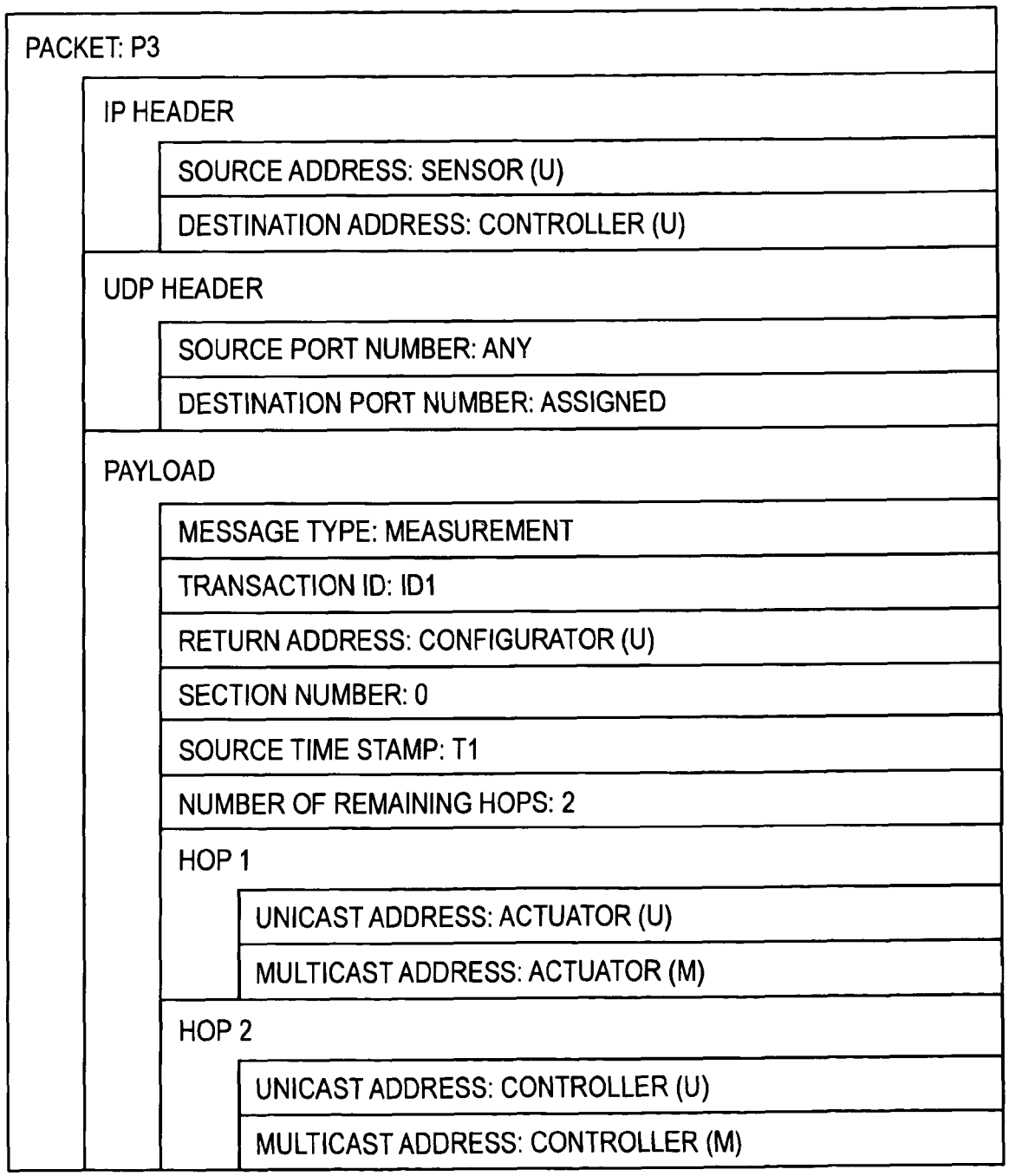
FIG. 9 is an example of the packet format utilized in the field control system.

As shown in FIG. 9, the packet P3 has the fields such as the IP header, the UDP header, the payload, and the like. Also, the payload contains a plurality of fields such as "message type", "transaction ID", "return address" as the address of the time measurement packet, "section number" used to specify the section between the field equipments, "source time stamp" for storing a transmission time of the time measurement packet, "number of remaining hops", a plurality of "hop" fields, and others.

For example, the packet generating portion 5126 of the sensor 51 sets a value of the source address of the IP header in the packet P3 (e.g., a value of the destination address "the sensor 51" of the packet P1) and a value of the destination address (e.g., a value of the unicast address "the controller 52" in the hop 1 in the packet P1), based on the measurement request packet P1 fed from the configurator 54.

Also, the packet generating portion 5126 sets a value of the message type of the payload in the packet P3 (e.g., "measurement"), a value of the transaction ID (e.g., a value "ID1" of the transaction ID of the packet P1), the return address (e.g., a value of the return address "configurator 54" of the packet P1), the section number (e.g., "0"), the source time stamp (e.g., a time at which the packet P3 is transmitted "T1"), and the number of remaining hops (e.g., a value obtained by subtracting the value of the number of remaining hops of the packet P1 by 1 "2"), based on the packet P1 from the configurator 54. Also, a value of the hop 2 "actuator 53" in the packet P1 is set in the hop 1 of the packet P3, and a value of the hop 3 "controller 52" in the packet P1 is set in the hop 2, and the unicast address and the multicast address are stored respectively. In this case, the generation of the time measurement packet and the measured result packet associated with the acquisition of the time stamp is similar to the above mainly except the IP address setting and the affix of the time stamp, and therefore their explanation will be omitted herein.

In a sequence SQ104, the controller 52 generates the measured result packet (e.g., the packet P4 in FIG. 10) of the sensor 51 and the controller 52, and transmits this packet to the configurator 54 via the network NW200. At this time, the time stamp affixing portion (not shown) of the controller 52 affixes a receive time (e.g., "T2") of the time measurement packet from the sensor 51 to this measured result packet. Therefore, the controller 52 informs the configurator 54 of the time stamp at which the sensor 51 and the controller 52 transmits/receives the time measurement packet.

Figure 10:
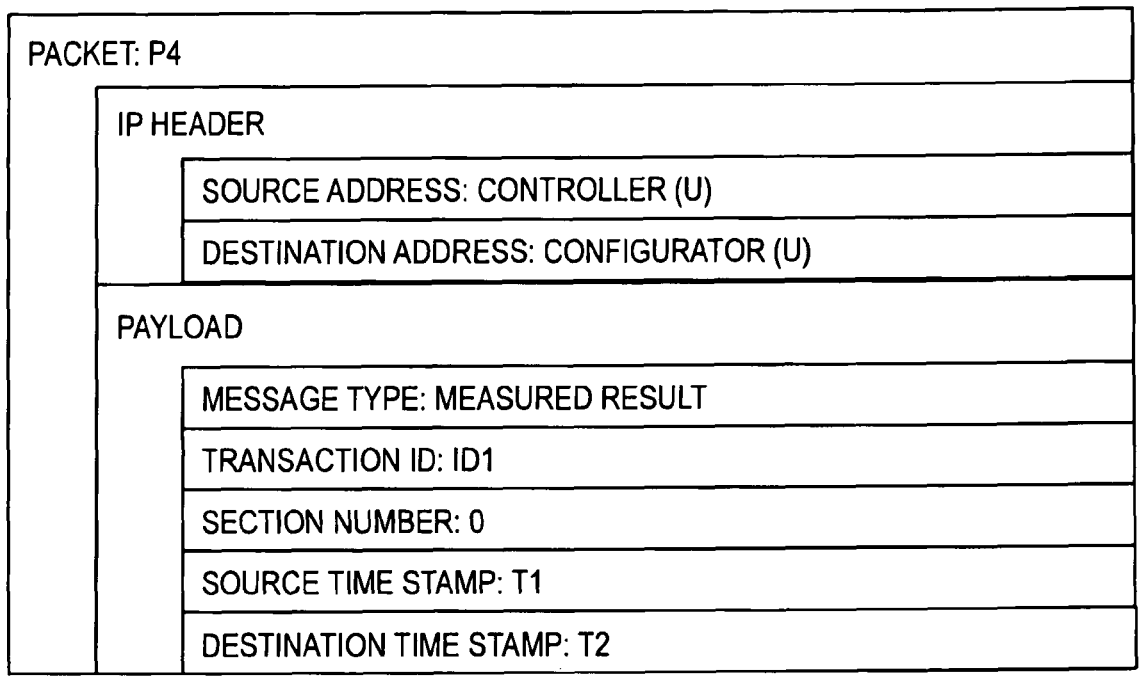
FIG. 10 is an example of the packet format utilized in the field control system.

As shown in FIG. 10, the packet P4 has the IP header and the payload. Also, the payload contains a plurality of fields such as "message type", "transaction ID", "section number", "source time stamp" at which a transmission time of the time measurement packet is stored, "destination time stamp" at which a reception time of the time measurement packet is stored, and the like.

For example, the packet generating portion (not shown) of the controller 52 sets a value of the source address of the IP header in the packet P4 (e.g., a value of the destination address "controller 52" in the packet P2), and a value of the destination address (e.g., a value of the return address "configurator 54" in the packet P3), based on packets P2 and from the sensor 51. That is, the packet transmitting/receiving portion of the controller 52 sets the unicast address of the configurator as the destination.

Also, the packet generating portion of the controller sets a value of the message type in the payload in the packet (e.g., "measured result"), a value of the transaction ID (e.g., a value of the transaction ID "ID1" of the packet P3), a value of the section number in the packet P3 (e.g., "0"), the source time stamp (e.g., a value of the source time stamp "T1" of the packet P3), and the destination time stamp (e.g., a time at which the packet P3 is received "T2").

In a sequence SQ105, the packet analyzing portion 5422 of the configurator 54 extracts the time stamps of the sensor 51 and the controller 52 by analyzing the measured result packet from the controller 52. The communication period grasping portion 5425 calculates the communication time between the sensor 51 and the controller 52 based on these time stamps, and stores this communication time in the schedule information storing portion 5423.

For example, the configurator 54 calculates a difference between the source time stamp, which is affixed to the measured result packet from the controller 52, of the sensor 51 (e.g., "T1") and the destination time stamp of the controller 52 (e.g., "T2"), and grasps the communication time between the sensor 51 and the controller 52. Therefore, the configurator 54 can grasp the communication time between the sensor 51 and the controller 52.

In a sequence SQ106, the controller 52 generates the multicast communication initialization packet and transmits this packet to the actuator 53. Here, the multicast communication initialization packet is similar to the above packet P2 in FIG. 8 except the source address, the destination address, and the multicast address, and therefore their explanation will be omitted herein.

In this case, when the actuator 53 executes the initialization of the multicast communication based on the multicast communication initialization packet from the controller 52, such actuator may inform the controller 52 of that effect of the end of initialization.

In a sequence SQ107, the controller 52 generates the time measurement packet fed from the controller 52 to the actuator 53, and transmits this packet to the actuator 53. At this time, the controller 52 adds a transmission time (e.g., "T3") to this time measurement packet.

In a sequence SQ108, the actuator 53 generates the measured result packet, and transmits this packet to the configurator 54. At this time, the actuator 53 adds a reception time of the time measurement packet from the controller 52 (e.g., "T4") to this measured result packet. That is, the actuator 53 informs the configurator 54 of the time stamps at which the controller 52 and the actuator 53 transmit/receive the time measurement packet.

In a sequence SQ109, the packet analyzing portion 5422 of the configurator 54 extracts the time stamps of the controller 52 and the actuator 53 by analyzing the measured result packet from the actuator 53. The communication period grasping portion 5425 calculates the communication time between the controller 52 and the actuator 53 based on these time stamps, and stores this communication time in the schedule information storing portion 5423.

For example, the configurator 54 calculates a difference between the source time stamp, which is affixed to the measured result packet from the actuator 53, of the controller 52 (e.g., "T3") and the destination time stamp of the controller 52 (e.g., "T4"), and grasps the communication time between the controller 52 and the actuator 53. Therefore, the configurator 54 can grasp the communication time between the controller 52 and the actuator 53.

In a sequence SQ110, the actuator 53 generates the multicast communication initialization data packet, and transmits this packet to the controller 52. Here, when the controller 52 executes the initialization of the multicast communication based on the multicast communication initialization data from the actuator 53, such controller may inform the actuator 53 the effect of end of initialization.

In a sequence SQ111, the actuator 53 generates the time measurement packet, and transmits this packet to the controller 52. At this time, the controller 52 adds a transmission time of the packet (e.g., "T5") to the time measurement packet.

In a sequence SQ112, the controller 52 generates the measured result packet, and transmits this packet to the configurator 54. At this time, the controller 52 adds a reception time of the time measurement packet from the actuator 53 (e.g., "T6") to this measured result packet. That is, the controller 52 informs the configurator 54 of the time stamps at which the actuator 53 and the controller 52 transmits/receives the time measurement packet.

In a sequence SQ113, the packet analyzing portion 5422 of the configurator 54 extracts the time stamps of the actuator 53 and the controller 52 by analyzing the measured result packet from the controller 52. The communication period grasping portion 5425 calculates the communication time between the actuator 53 and the controller 52 based on these time stamps, and stores the communication time in the schedule information storing portion 5423.

For example, the configurator 54 calculates a difference between the source time stamp, which is affixed to the measured result packet from the controller 52, of the sensor 51 (e.g., "T5") and the destination time stamp of the controller 52 (e.g., "T6"), and grasps the communication time between the actuator 53 and the controller 52. Therefore, the configurator 54 can grasp the communication time between the actuator 53 and the controller 52.

In a sequence SQ114, the schedule setting portion 5424 of the configurator 54 adjusts the operation schedules of respective field equipments based on the communication times between respective field equipments stored in the schedule information storing portion 5423, and generates schedule setting information.

In sequences SQ115 to SQ117, the packet generating portion 5426 of the configurator 54 generates the schedule set packet. The packet transmitting/receiving portion 5421 transmits this schedule set packet to the sensor 51, the controller 52, and the actuator 53 via the network NW200. Also, respective field equipments set the schedule based on the schedule setting information from the configurator 54. In this case, as the schedule setting method of respective field equipments, the method based on the used field bus may be employed.

As a result, the configurator transmits the measurement request packet to the field equipment, then the field equipment transfers the time measurement packet to other field equipment along the flow of the control loop, then the field equipment transmits the measured result packet to which the source and destination time stamps are added to the configurator, and then the configurator calculates the communication time between respective field equipments based on these time stamps and adjusts the schedule. Therefore, the operation schedule of the field equipment can be adjusted by taking account of communication times required between respective field equipments.

Also, the field control system of the present invention can adjust the operation schedule of the field equipment by taking account of communication times required between respective field equipments even though such system is built up by using the complicated network.

In the above embodiment, explanation is made by selecting the timing at which the operator controls the configurator 54 or the configurator 54 transmits the measurement request packet after a predetermined time has elapsed, as the timing at which the configurator 54 transmits the measurement request packet. But the present invention is not limited to this embodiment. The configurator may transmit the measurement request packet based on the "delay notice packet" issued from each field equipment to inform the effect that the delay of the control process is detected. In other words, the delay notice packet issued from each field equipment may be used as a trigger of the schedule adjustment.

For example, the operation controlling portion constituting respective field equipments such as the sensor 51, the controller 52, the actuator 53, and the like has a delay detecting function of deciding whether or not the control process is operated along the schedule set previously, and then transmitting the "delay notice packet" to the configurator 54 when the delay of the control process is detected.

Concretely, the delay detecting function of each field equipment compares an arrive time of the control packet (containing the measured value of the sensor, the control data of the controller, the feedback data of the actuator, and the like, for example) associated with the control process with a previously set control processing period, or the like, decides that the control process is delayed when the control packet does not arrive at within the schedule, and the transmits the delay notice packet.

Figure 11:
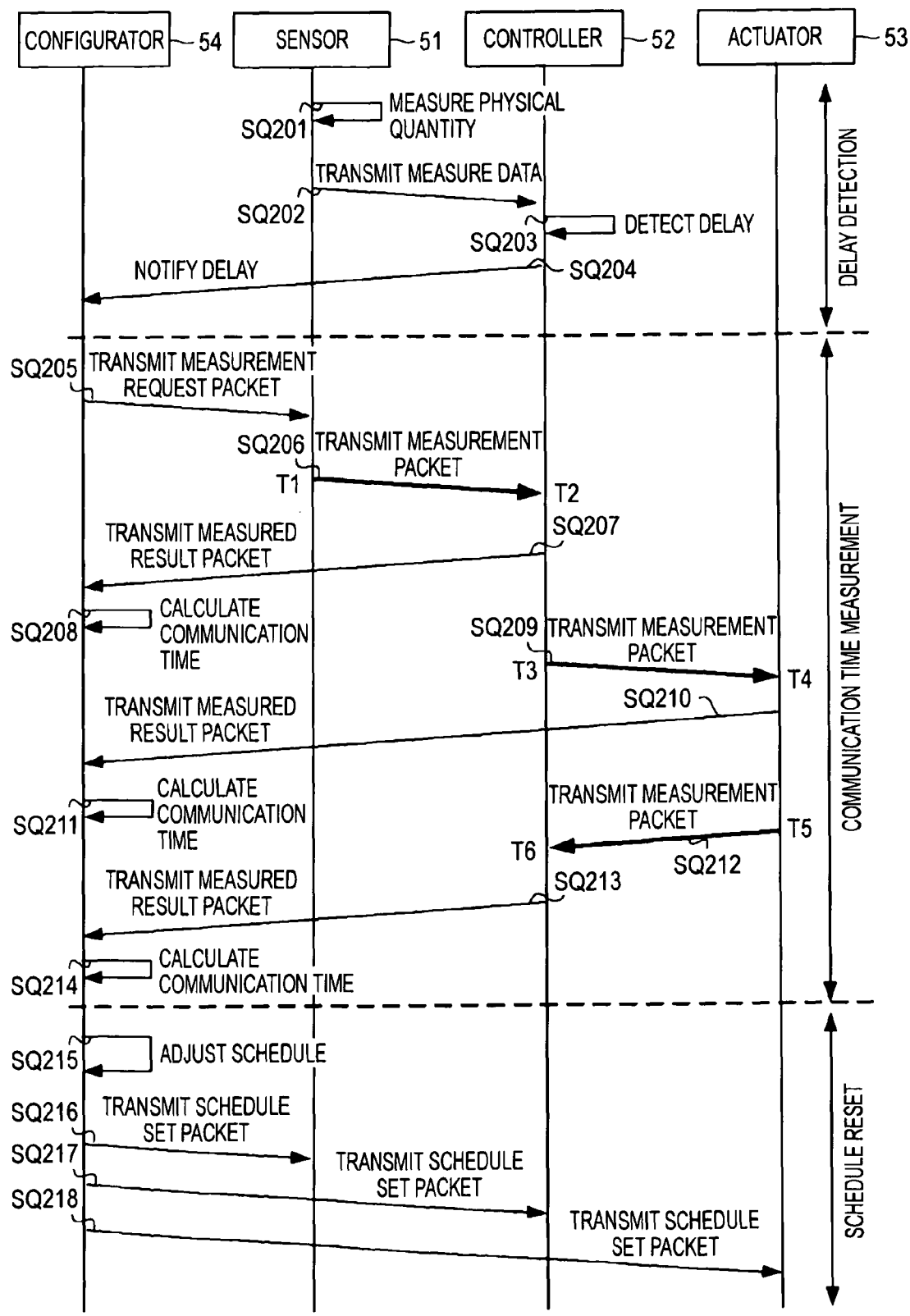
FIG. 11 is a sequence diagram explaining an example of operations of the field control system, which grasp a communication time based on a delay notice packet.

FIG. 11 is a sequence diagram explaining an example of operations of the field control system, which grasp the communication time based on the delay notice packet. As shown in FIG. 11, the field control system is classified roughly into the flows of "delay detection", "communication time measurement", and "schedule resetting".

First, in a sequence SQ201, the inherent function executing portion 124 of the sensor 51 in FIG. 5 measures a physical quantity such as a flow rate, a temperature, or the like based on the schedule stored in the schedule information storing portion 123. Also, in a sequence SQ202, the packet transmitting/receiving portion 5121 of the sensor 51 transmits the measure value of the sensor to the controller 52.

In a sequence SQ203, the delay detecting function of the controller 52 compares an arrive time of the measured value from the sensor 51 with the schedule such as the previously set control processing period, or the like, and decides that the controlling process is delayed when the control packet does not arrive at within the schedule because the transmission time is prolonged by the load of the network, or the like.

In a sequence SQ204, the delay detecting function of the controller 52 transmits the delay notice packet, which informs the effect that the control process is delayed, to the configurator 54. In a sequence SQ205, the configurator 54 transmits the measurement request packet to the sensor 51 based on the delay notice packet from the controller 52. Respective sequences SQ206 to SQ218 are similar to the operations explained by reference to FIG. 6, and their explanation will be omitted herein.

In this manner, the field equipment may decide whether or not the control process is being executed according to the previously set schedule, and transmit the delay notice packet to the configurator when the delay of the control process is detected. Then, the configurator may transmit the measurement request packet to the field equipment based on the delay notice packet, then measure the communication time necessary for the packet communication between respective field equipments, then adjust respective schedules based on this communication time.

Also, in the above embodiment, an example in which the field control system aids the running of the plant in the industrial automation is explained. The present invention is not particularly limited to this embodiment. For example, the present invention may be developed to aid the running of the control system in the water-purification plant in the factory automation, the air conditioning system or the illumination system of the building, or FFHSE (Foundation Field bus High Speed Ethernet (registered trademark)).

For example, in the building automation system, when the network in which the field equipments constituting the control loop are installed is complicated, the communication time is easily changed depending on the load condition of the network, the load condition of the delay device. Therefore, the configurator transmits the measurement request packet to the field equipment, then the field equipment transfers the time measurement packet to other field equipment along the flow of the control loop, then the field equipment transmits the measured result packet to which the source and destination time stamps are added to the configurator, and then the configurator calculates the communication time between respective field equipments based on these time stamps and adjusts the schedule. As a result, the operation schedule of the field equipment can be adjusted by taking account of communication times required between respective field equipments.

Also, the field control system of the above embodiment is constructed by a plurality of field equipments such as the sensor 51, the controller 52, the actuator 53, and the like. But the field control system of the present invention may be constructed by one field equipment or more.

Also, the field control system of the above embodiment has the feedback control loop consisting of the sensor 51, the controller 52, the actuator 53, and the like. One control loop or more may be employed.

Also, the above embodiment, when each field equipment gets the time stamp via the multicast communication, such field equipment transmits previously the multicast communication initialization data. The present invention is not particularly limited to this embodiment. The configurator may transmit previously the multicast communication initialization data to respective field equipments. For example, as shown in the sequence SQ101 in FIG. 6, the configurator 54 may transmit the multicast communication initialization data to the sensor 51, the controller 52, and the actuator 53 respectively before such configurator transmits the measurement request data to the sensor 51.

Also, in the above embodiment, each field equipment transmits the measured result data to which the time stamp is added to the configurator every time when such field equipment gets the time stamp of the communication between respective field equipments. In this case, the field equipment may transfer the time measurement packet to which the time stamp is added along the feedback control loop every time when such field equipment gets the time stamp, and then transmit the measured result data, to which all time stamps in the communication between respective field equipments are added, to the configurator. In other words, the field equipment does not notify the configurator every time when the time stamp is acquired, but notifies the configurator at a time when all time stamps of the communication between respective field equipments are acquired.

Therefore, the number of times of communication between the configurator and respective field equipments can be reduced, and thus the number of times of communication can be optimized. Also, the field control system may be constructed by combining together the system in which the configurator transmits the multicast communication initialization data to respective field equipments and the system in which the time stamps between respective field equipments are sent at a time to the configurator.

Also, in the above embodiment, each field equipment notifies the configurator of the time stamp between respective field equipments. Each field equipment may notify the configurator of the "schedule information" in which the schedule of the processing time of the field equipment in the control process is set similarly to the time stamp. For example, the field equipment may transfer the time measurement packet to which the "schedule information" of the field equipment is added along the feedback control loop, and then transmit the measured result data, to which the "schedule information" of the sender and destination field equipments are added, to the configurator.

Accordingly, the configurator can get automatically the schedule information of respective field equipments via the network. Therefore, the operation schedule of the field equipment can be adjusted by taking account of communication times required between respective field equipments even though the configurator does not grasp the schedule of the processing time of each field equipment beforehand. Also, there is no need to cause the operator, or the like to store previously the schedule information and the processing times of respective field equipments in the configurator. Therefore, the input error of the operator, and the like can be prevented and also the operation schedule of each field equipment can be adjusted without fail.

Also, the time measurement packet to which the "schedule information" of the field equipment is added may be transferred along the control loop, and then the measured result data to which the "schedule information" of all field equipments are added may be transmitted to the configurator when the control has been passed around the control loop. In other words, each field equipment can notify the configurator of the "schedule information" of all field equipments at a time. Therefore, the number of times of communication between the configurator and respective field equipments can be reduced, and thus the number of times of communication can be optimized. Also, the operation schedule of each field equipment can be adjusted without fail.

Also, in the above embodiment, the configurator 54 acquires successively all time stamps "T1 to T6" by transmitting the measurement request data. Here, the configurator 54 may acquire separately the time stamps "T1 to T2", "T3 to T4", "T5 to T6", etc. by transmitting the measurement request data plural times. In this case, the configurator 54 updates the transaction ID every time when it sends out the measurement request data. For example, the configurator 54 may acquire the time stamps "T1 to T2" when the transaction ID is "ID1", acquire the time stamps "T3 to T4" when the transaction ID is "ID2", and acquire the time stamps "T5 to T6" when the transaction ID is "ID3".

Also, the configurator may decide a range within which the time stamps can be acquired at a time by controlling the number of times of transmission of the measurement request data. For example, when the configurator transmits twice the measurement request data, such configurator may acquire the time stamps "T1 to T4" when the transaction ID is "ID1", and acquire the time stamps "T5 to T6" when the transaction ID is "ID2".

Also, in the above embodiment, the configurator grasps the communication time between respective field equipments. In this event, the configurator may grasp at least any one of the communication times between respective field equipments, and set the operation schedules of respective field equipments based on the communication time. For example, when the configurator specifies the field equipments constituting the communication between the field equipments to be grasped in the "hop" of the payload in the measurement request packet, the configurator may grasp at least any one of the communication times between respective field equipments.

Also, the configurator may measure the communication time by setting the communication time between the particular field equipments as the target. For example, when only the particular field equipment is specified in the "hop" of the payload of the measurement request packet, the configurator can measure the communication time by setting the communication time between the particular field equipments as the target.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DRAWINGS

FIG. 1:
(1) Network NW200
(2) sensor 51
(3) controller 52
(4) actuator 53
(5) configurator 54
FIG. 2:
(1) 54: configurator
(2) communicating portion 541
(3) operation controlling portion 542
(4) memory portion 543
FIG. 3:
(1) 542: operation controlling portion
(2) packet transmitting/receiving portion 5421
(3) packet analyzing portion 5422

(4) schedule information storing portion 5423
(5) schedule setting portion 5424
(6) communication period grasping portion 5425
(7) packet generating portion 5426
FIG. 4:
(1) 51: sensor
(2) communicating portion 511
(3) operation controlling portion 512
(4) memory portion 513
FIG. 5:
(1) 512: operation controlling portion
(2) packet transmitting/receiving portion 5121
(3) packet analyzing portion 5122
(4) schedule information storing portion 5123
(5) inherent function executing portion 5124
(6) communication time measuring portion 5125
(7) packet generating portion 5126
(8) time stamp affixing portion 5127
(9) multicast communication initializing portion 5128
(10) schedule setting portion 5129
FIG. 6:
(1) sensor 51
(2) controller 52
(3) actuator 53
(4) configurator 54
(5) transmit a measurement request packet (packet P1) (SQ101)
(6) transmit a multicast communication initialization packet (packet P2)(SQ102)
(7) transmit a measurement packet (packet P3) (SQ103)
(8) transmit a measured result packet (packet P4)(SQ104)
(9) calculate a communication time (SQ105)
(10) transmit a multicast communication initialization packet (SQ106)
(11) transmit a measurement packet (SQ107)
(12) transmit a measured result packet (SQ108)
(13) calculate a communication time (SQ109)
(14) transmit a multicast communication initialization packet (SQ110)
(15) transmit a measurement packet (packet P3) (SQ111)
(16) transmit a measured result packet (SQ112)
(17) calculate a communication time (SQ113)
(18) adjust a schedule (SQ114)
(19) transmit s schedule set packet (SQ115)
(20) transmit s schedule set packet (SQ116)
(21) transmit s schedule set packet (SQ117)
a: communication time measurement
b: schedule reset
FIG. 7:
a: Packet: P1
b: IP header
c: source address: configurator (U)
d: destination address: sensor (U)
e: UDP header
f: source port number: ANY
g: destination port number: ASSIGNED
h: payload
i: message type: measuring request
j: transaction ID: ID1
k: return address: configurator (U)
l: number of remaining hops: 3
m: hop 1
n: unicast address: controller (U)
o: multicast address: controller (M)
p: hop 2
q: unicast address: actuator (U)
r: multicast address: actuator (M)
s: hop 3
t: unicast address: actuator (U)
u: multicast address: actuator (M)
FIG. 8:
a: Packet: P2
b: IP header
c: source address: sensor (U)
d: destination address: controller (U)
e: UDP header
f: source port number: ANY
g: destination port number: ASSIGNED
h: payload
i: message type: multicast communication initialization
j: transaction ID: ID1
k: multicast address: controller (M)
FIG. 9:
a: Packet: P3
b: IP header
c: source address: sensor (U)
d: destination address: controller (U)
e: UDP header
f: source port number: ANY
g: destination port number: ASSIGNED
h: payload
i: message type: measurement
j: transaction ID: ID1
k: return address: configurator (U)
l: section number: 0
m: source time stamp: T1
n: number of remaining hops: 2
o: hop 1
p: unicast address: actuator (U)
q: multicast address: actuator (M)
r: hop 2
s: unicast address: controller (U)
t: multicast address: controller (M)
FIG. 10:
a: Packet: P4
b: IP header
c: source address: controller (U)
d: destination address: configurator (U)
e: payload
f: message type: measured result
g: transaction ID: ID1
h: section number: 0
i: source time stamp: T1
j: destination time stamp: T2
FIG. 11:
(1) sensor 51
(2) controller 52
(3) actuator 53
(4) configurator 54
(5) measure a physical quantity (SQ201)
(6) transmit measure data (SQ202)
(7) detect a delay (SQ203)
(8) notify a delay (SQ204)
(9) transmit a measurement request packet (SQ205)
(10) transmit a measurement packet (SQ206)
(11) transmit a measured result packet (SQ207)
(12) calculate a communication time (SQ208)
(13) transmit a measurement packet (SQ209)
(14) transmit a measured result packet (SQ210)
(15) calculate a communication time (SQ211)

Figure 12:
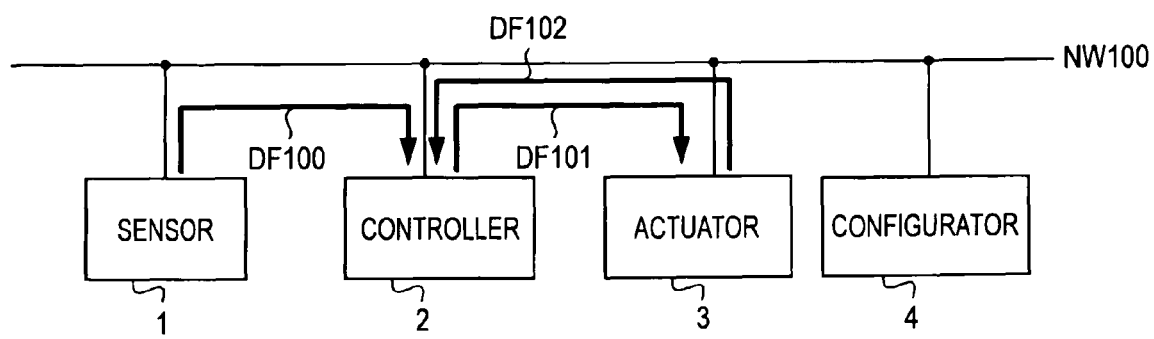
FIG. 12 is a configurative block diagram showing an example of the field control system in the related art.
Figure 13:
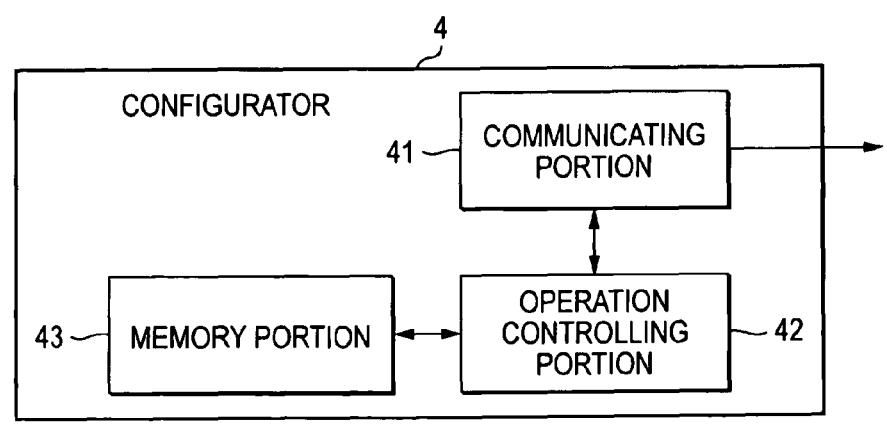
FIG. 13 is a configurative block diagram of a configurator 4 in FIG. 12.
Figure 14:
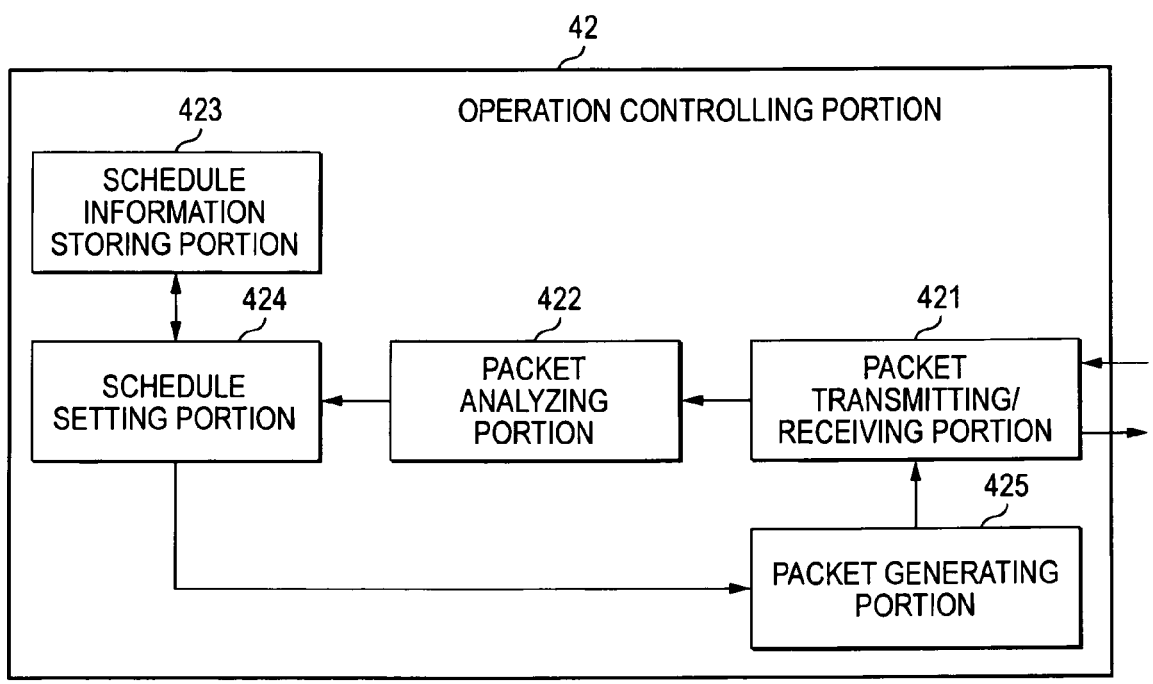
FIG. 14 is a functional block diagram of an operation controlling portion 42 constituting the configurator 4 in FIG. 13.
Figure 15:
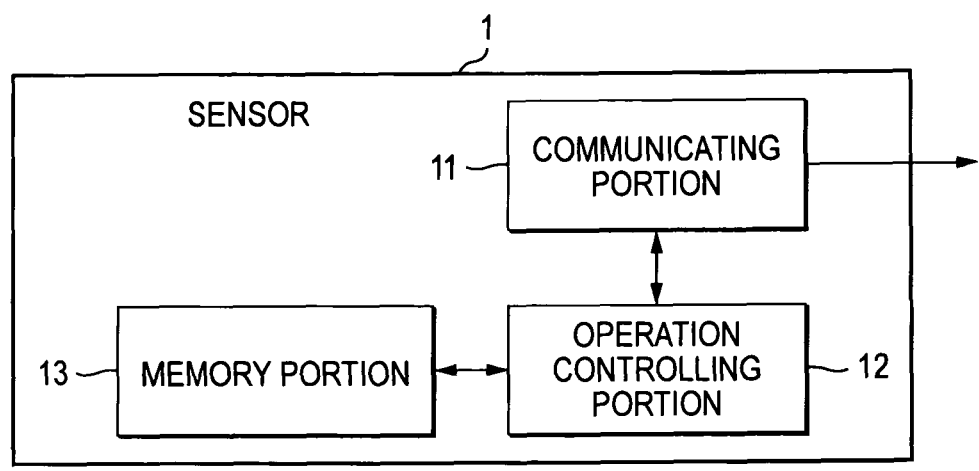
FIG. 15 is a configurative block diagram of a sensor 1 in FIG. 14.
Figure 16:
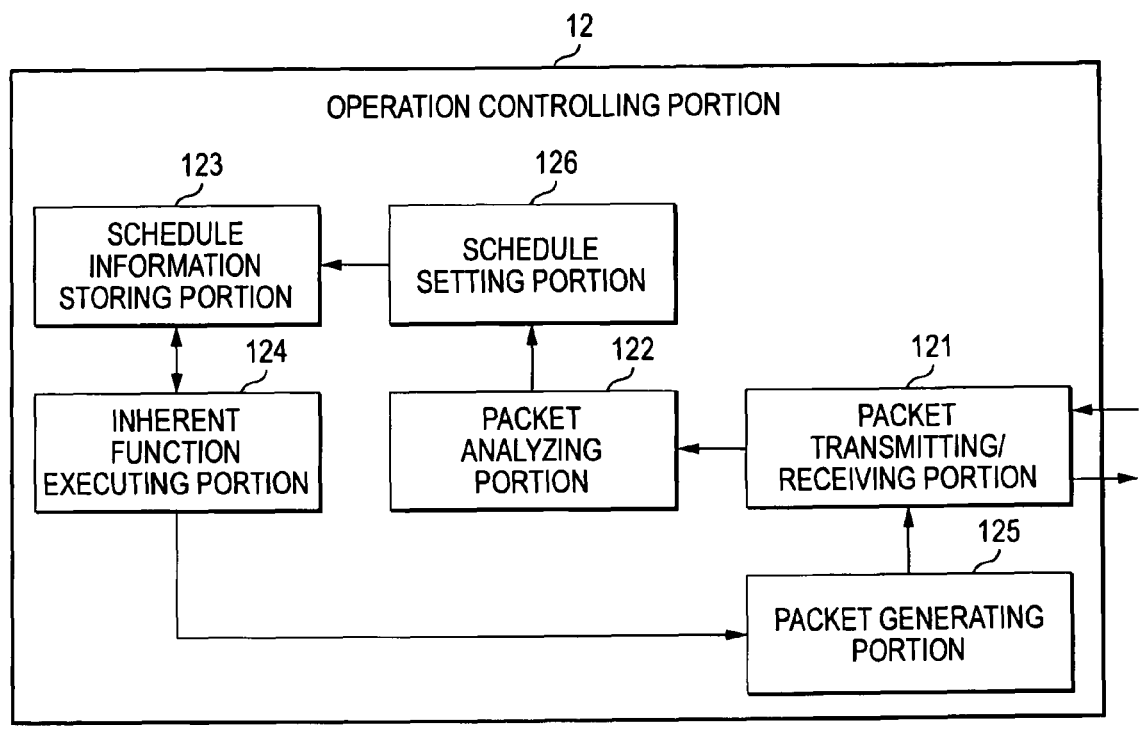
FIG. 16 is a functional block diagram of an operation controlling portion 12 constituting the sensor 1 in FIG. 15.
Figure 17:
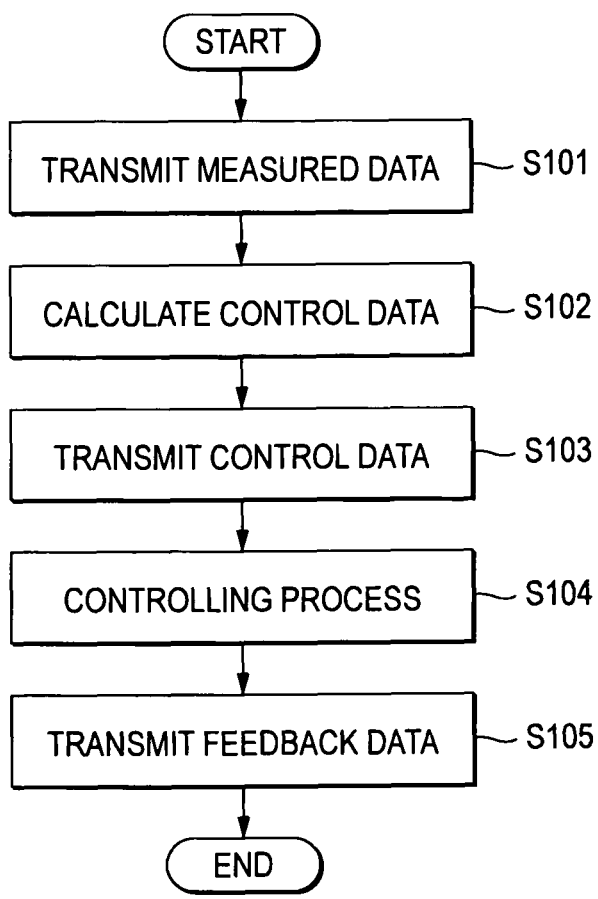
FIG. 17 is a flowchart explaining operations of the field control system.
Figure 18:
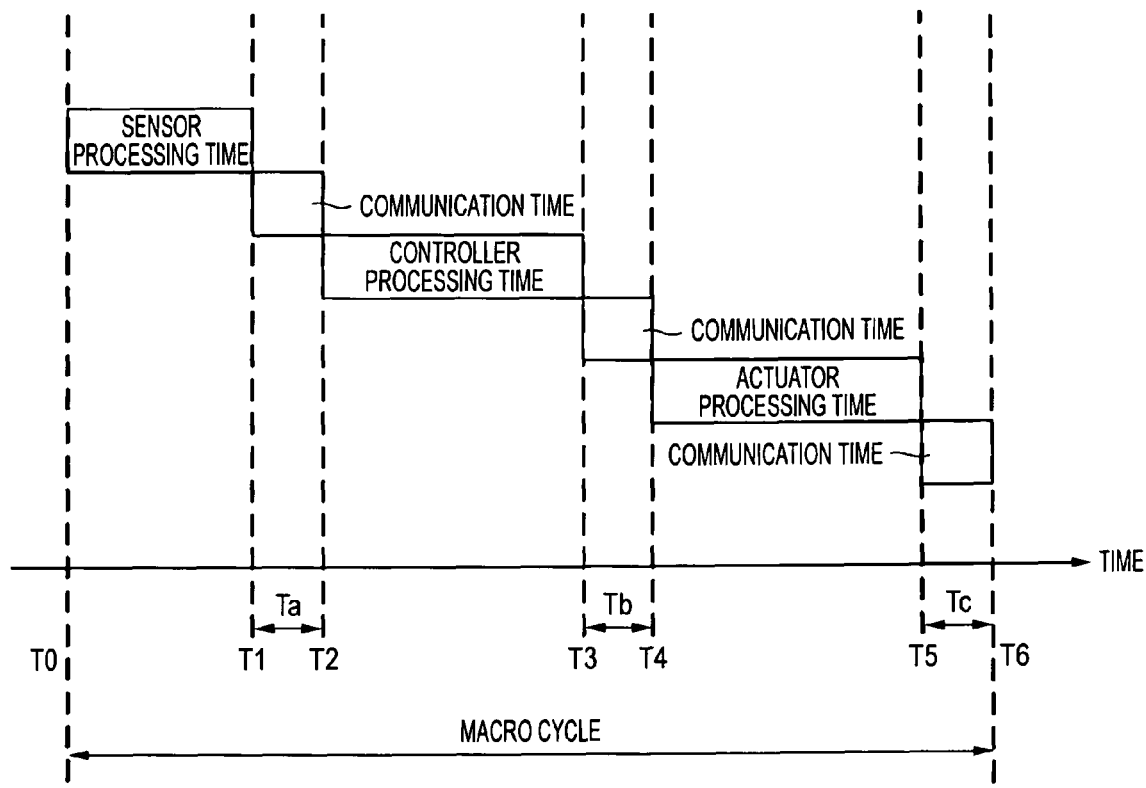
FIG. 18 is an explanatory view of an operation schedule and a communication time of each field equipment.
Figure 19:
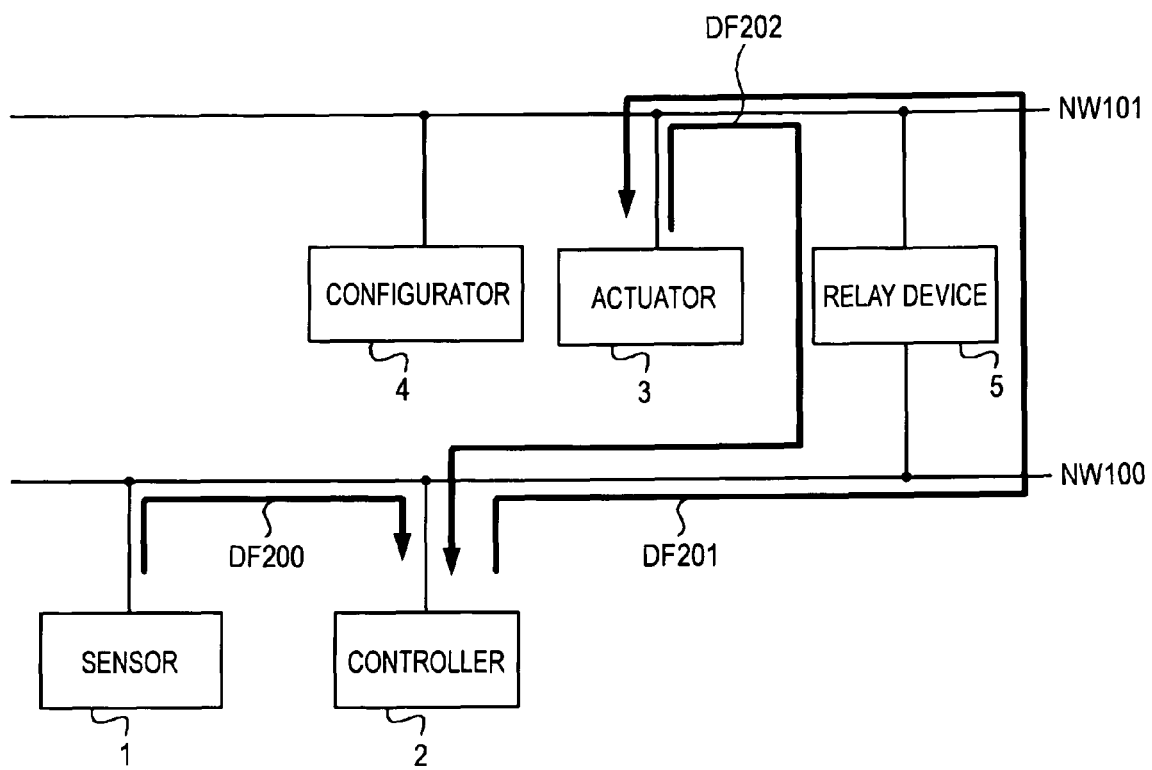
FIG. 19 is a configurative block diagram showing an example of the field control system equipped with a relay device.
Figure 20:
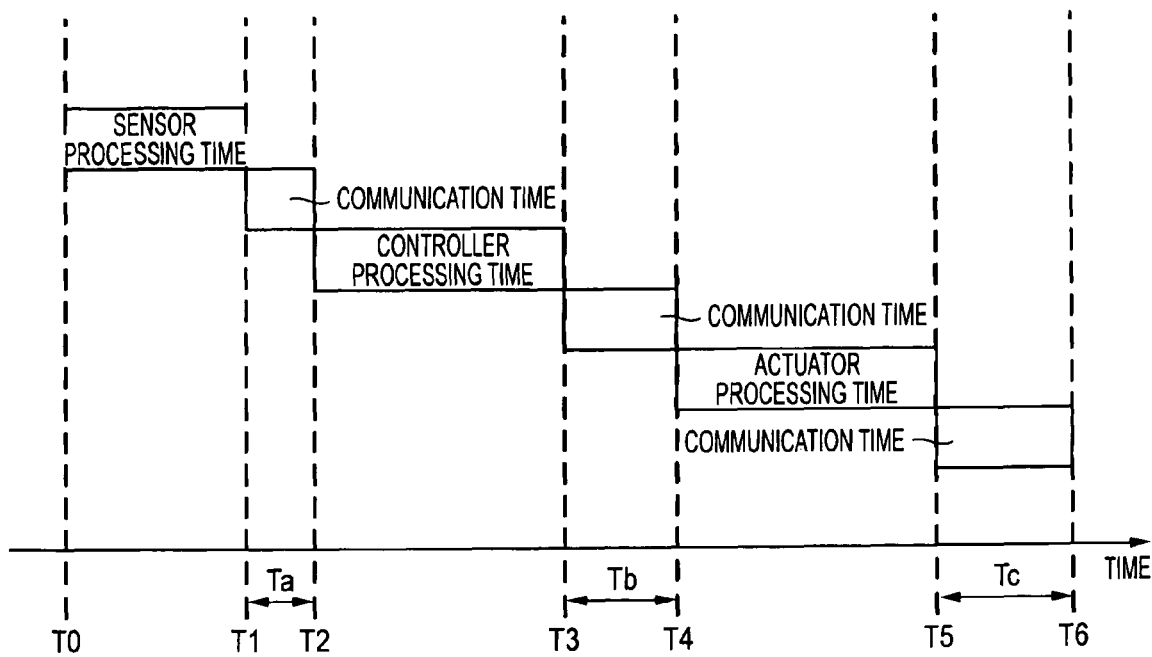
FIG. 20 is an explanatory view of communication times between the field equipments of the field control system in FIG. 19.

(16) transmit a measurement packet (SQ212)
(17) transmit a measured result packet (SQ213)
(18) calculate a communication time (SQ214)
(19) adjust a schedule (SQ215)
(20) transmit s schedule set packet (SQ216)
(21) transmit s schedule set packet (SQ217)
(22) transmit s schedule set packet (SQ218)
a: delay detection
b: communication time measurement
c: schedule reset
FIG. 12:
(1) sensor 1
(2) controller 2
(3) actuator 3
(4) configurator 4
FIG. 13:
(1) 4: configurator
(2) communicating portion 41
(3) operation controlling portion 42
(4) memory portion 43
FIG. 14:
(1) 42: operation controlling portion
(2) packet transmitting/receiving portion 421
(3) packet analyzing portion 422
(4) schedule information storing portion 423
(5) schedule setting portion 424
(6) packet generating portion 425
FIG. 15:
(1) 1: sensor
(2) communicating portion 11
(3) operation controlling portion 12
(4) memory portion 13
FIG. 16:
(1) 12: operation controlling portion
(2) packet transmitting/receiving portion 121
(3) packet analyzing portion 122
(4) schedule information storing portion 123
(5) inherent function executing portion 124
(6) packet generating portion 125
(7) schedule setting portion 126
FIG. 17:
a: start
(2) transmit measured data (S101)
(3) calculate control data (S102)
(4) transmit control data (S103)
(5) controlling process (S104)
(6) transmit feedback data (S105)
b: end
FIG. 18:
a: sensor processing time
b: communication time
c: controller processing time
d: actuator processing time
e: macro cycle
f: time
FIG. 19:
(1) sensor 1
(2) controller 2
(3) actuator 3
(4) configurator 4
(5) relay device 5
FIG. 20:
a: sensor processing time
b: communication time
c: controller processing time
d: actuator processing time
e: time

What is claimed is:

1. A field control system comprising:
a plurality of field equipments that are operated in a previously set schedule and constitute a control loop, the field equipments performing a packet communication via a network; and
a configurator which collects a measured result packet to which a first time stamp corresponding to a transmission time and a second time stamp corresponding to a reception time are affixed, calculates an amount of time required for a measurement packet communication between a first field equipment and a second field equipment among the plurality of field equipments based on the first affixed time stamp and the second affixed time stamp, and adjusts operation schedules of respective field equipments in response to the calculated amount of time,
wherein the second field equipment, when it detects a delay of a control process, transmits a delay notice packet to the configurator.

2. The field control system according to claim 1, wherein the configurator transmits a measurement request packet to the first field equipment based on the delay notice packet, and the first field equipment transmits a time measurement packet based on the measurement request packet.

3. The field control system according to claim 1, wherein the first or the second field equipment comprises:
a communicating portion for performing a packet communication;
a storing portion for storing schedule information of the respective field equipment; and
an operation controlling portion for transmitting a time measurement packet to at least one of plurality of field equipments and transmitting the measured result data to which a transmission time and a reception time of the time measurement packet are added to the configurator.

4. The field control system according to claim 3, wherein the operation controlling portion transmits the delay notice packet unless a control packet arrives at within a predetermined time.

5. The field control system according to claim 1, wherein the configurator comprises:
a communicating portion for performing the packet communication;
a storing portion for storing schedule information of the first field equipment and a communication time; and
an operation controlling portion for transmitting a time measurement packet to the first field equipment, calculating the communication time based on the transmission time and the reception time of the time measurement packet added to the measured result packet of the first field equipment, and adjusting a schedule of the first field equipment based on the communication time.

6. The field control system according to claim 1, wherein the first field equipment transmits a first measurement packet including the first time stamp which indicates the time at which the first measurement packet was transmitted to the second field equipment among the plurality of field equipments.

7. The field control system according to claim 6, wherein the second field equipment transmits a second measurement packet to the configurator including the first time stamp and the second time stamp which indicates the time at which the first measurement packet was received by the second field equipment.

8. The field control system according to claim 7, wherein the configurator measures the amount of time required for the measurement packet communication between the first and the second field equipments by calculating a difference between the first time stamp and the second time stamp.

9. A field control system comprising:
- a plurality of field equipments that are operated in a previously set schedule and constitute a control loop, the field equipments performing a packet communication via a network; and
- a configurator which collects a measured result packet to which a first time stamp corresponding to a transmission time and a second time stamp corresponding to a reception time are affixed, calculates an amount of time required for a measurement packet communication between a first field equipment and a second field equipment among the plurality of field equipments based on the first affixed time stamp and the second affixed time stamp, and adjusts operation schedules of respective field equipments in response to the calculated amount of time,
- wherein the first field equipment initiates the measurement packet communication by transmitting a time measurement packet to the second field equipment, and the second field equipment transmits the measured result packet to the configurator, and
- wherein the second field equipment, when it detects a delay of a control process, transmits a delay notice packet to the configurator.

10. The field control method performed in a field control device in which a plurality of field equipments that are operated in a previously set schedule and constitute a control loop perform a packet communication via a network, said method comprising:

- collecting a measured result packet to which a first time stamp corresponding to a transmission time and a second time stamp corresponding to a reception time are affixed;
- calculating an amount of time required for a measurement packet communication between a first field equipment and a second field equipment among the plurality of field equipments based on the first affixed time stamp and the second affixed time stamp; and
- adjusting operation schedules of respective field equipments in response to the calculated amount of time,
- wherein the second field equipment, when it detects a delay of a control process, transmits a delay notice packet to a configurator.

11. The field control method according to claim 10, wherein the first field equipment transmits a first measurement packet including the first time stamp which indicates the time at which the first measurement packet was transmitted to the second field equipment among the plurality of field equipments.

12. The field control system according to claim 11, wherein the second field equipment transmits a second measurement packet including the first time stamp and the second time stamp which indicates the time at which the first measurement packet was received by the second field equipment to a configurator.

13. The field control system according to claim 12, wherein the configurator measures the amount of time required for the measurement packet communication between the first and the second field equipments by calculating a difference between the first time stamp and the second time stamp.

* * * * *